United States Patent [19]

Sutton

[11] 4,455,720
[45] Jun. 26, 1984

[54] CLAMP APPARATUS

[76] Inventor: Bailous C. Sutton, 1182 Fernlea Dr., West Palm Beach, Fla. 33409

[21] Appl. No.: 387,928

[22] Filed: Jun. 14, 1982

[51] Int. Cl.³ .................... A44B 21/00; B65D 63/00
[52] U.S. Cl. .................................... 24/20 S; 24/484
[58] Field of Search ............. 24/19, 20 R, 24, 20 TT, 24/269, 270, 271, 272, 284, 205, 339, 256, 254, 252 A, 20 S; 285/411

[56] References Cited

U.S. PATENT DOCUMENTS

| 2,706,648 | 4/1955 | Goose | 24/271 |
|---|---|---|---|
| 2,882,071 | 4/1959 | Klompar | 24/271 |
| 3,600,770 | 8/1971 | Halling | 285/411 |
| 3,635,506 | 1/1972 | Womble et al. | 24/284 |
| 3,962,759 | 6/1976 | Nagai | 24/269 |
| 4,341,406 | 7/1982 | Abbes et al. | 285/411 |

FOREIGN PATENT DOCUMENTS

| 559405 | 2/1944 | Australia | 285/411 |
|---|---|---|---|
| 121911 | 7/1946 | Australia | 285/411 |

Primary Examiner—Gene Mancene
Assistant Examiner—John G. Weiss
Attorney, Agent, or Firm—William M. Hobby, III

[57] ABSTRACT

A clamping apparatus for clamping a group of cables, or the like, is formed of a plurality of clamp segments each formed to be movably connected to another segment on one or both ends of the segment. One or more elongated springs is attached through the connected clamp segments and each spring has each end attached to one of the segments so that the spring will bias the segments and allow the segments to be clamped around a bundle of cables, or the like, and to be snapped open for removing or changing the cables. The clamp segments can have one or more springs therein. One embodiment has a cable, cord or band attached to one end and extending around the segments and onto a spool for use in opening or closing the distal end portions of the clamping mechanism. The cord, cable or band may be aligned with eyes, guides or rollers attached to some of the segments.

12 Claims, 8 Drawing Figures

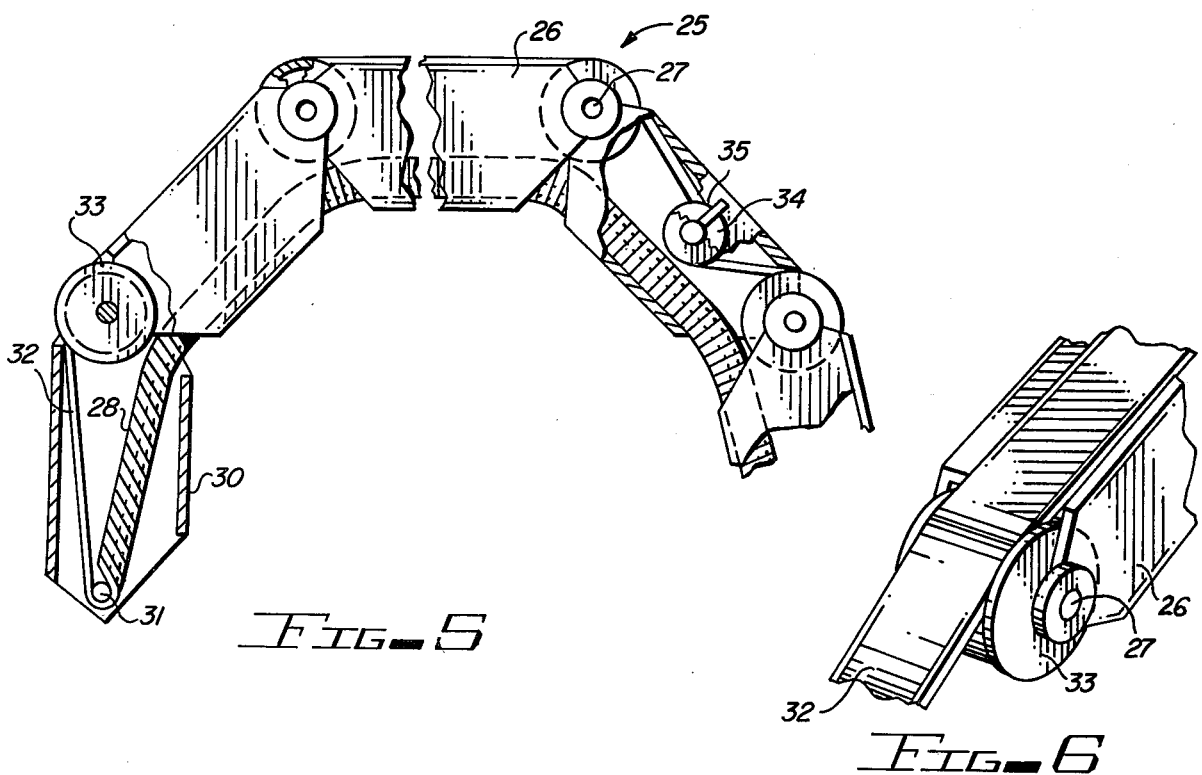
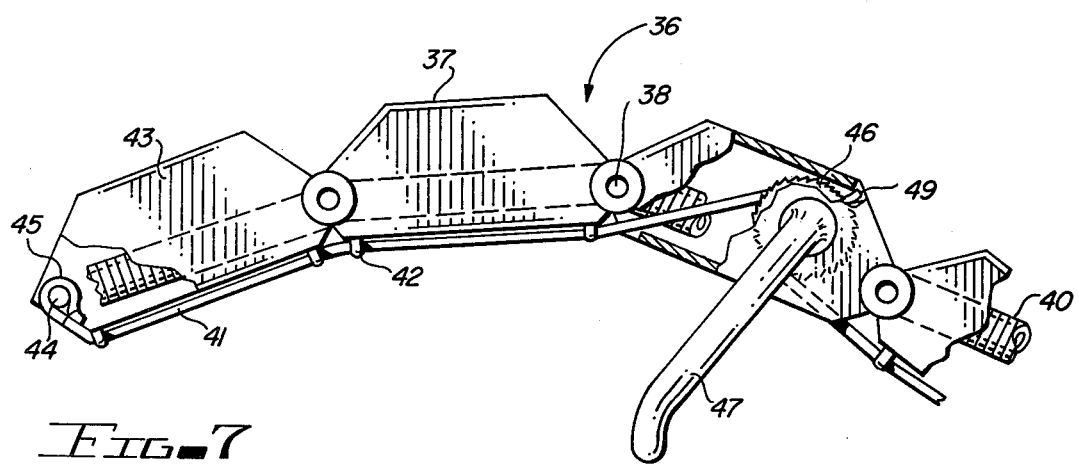
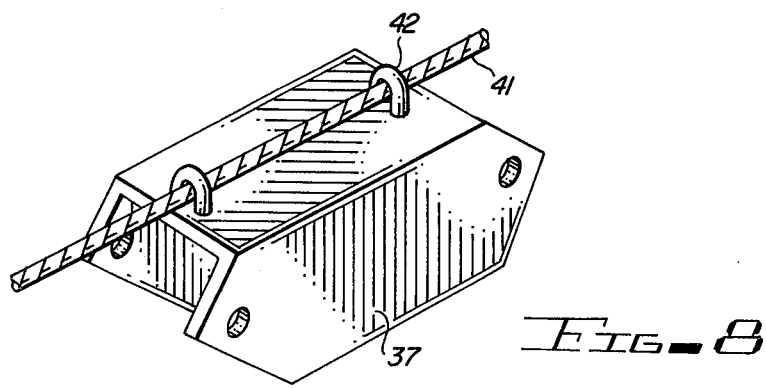

CLAMP APPARATUS

BACKGROUND OF THE INVENTION

The present invention relates to clamping mechanisms and especially to a clamping mechanism for snapping around a grouping of cables, cords, or the like, for holding the cables bunched together.

In the past, it has been common to bind groups of electrical cables, cords, ropes, or other cables together by tying them with a small cord or wire or by using special straps to bundle the cables together. The present invention deals with a special clamp which can be readily snapped onto cables or other material for holding cables together and which can be readily snapped open for changing the cables and which is especially effective in attaching large cables together. Prior U.S. patents showing various types of clamps can be seen in U.S. Pat. No. 3,635,506 for a clamp for coupling pipes and in U.S. Pat. No. 1,910,116 for a means for automatic tightening of fastening loops which utilizes springs for taking up slack in a loop connection. Similarly, the present invention will allow the ends of the clamping segments to extend over each other to clamp down on any number of cables. U.S. Pat. No. 3,475,793 is a spring tensioned band clamping device which has means for clamping hoses of different diameters. In U.S. Pat. No. 2,757,691, an expansible ferrule for metal tubing is provided for securing reinforcing braid to the end of a length of flexible corrugated metal tubing and had a circular steel band which can tighten down on the tubing; and U.S. Pat. No. 2,345,025 has blocks attached to a flexible band.

The present invention has a clamp for clamping, rope, electrical cords, cables and any other grouping of elongated members with a spring loaded clamp formed of a plurality of connected segments leaving two ends that can clamp around the cable and will expand or contract to add or take away individual cable members.

SUMMARY OF THE INVENTION

A clamping apparatus for clamping a plurality of cables, ropes, or the like, includes a plurality of clamp segments, each segment being movably pinned to at least one other segment to form a series of connected segments. One or more elongated springs are attached through the plurality of clamp segments and each spring has each end attached to one of the segments to bias the segment and thereby pull the ends of the connected segments into a wraparound pattern clamping around one or more items extending therethrough. Each segment may be shaped to have a pair of narrowing ends pinned together in a manner that one segment can move in at least one direction on it's next adjacent segment.

An alternate embodiment includes cord, cable or band attached to one end segment and extending around the connected clamp segments and connected to a spool rotatably attached to a second segment. This spool can have a handle for taking up or releasing the cord for opening or closing the clamping mechanism. A cord, cable or band may be guided with a plurality of eyes, guides or rollers attached to the segments.

BRIEF DESCRIPTION OF THE DRAWINGS

Other objects, features and advantages of the present invention will be apparent from the written description and the drawings, in which:

FIG. 5 is a side elevation of a portion of a second embodiment of a clamping mechanism having portions cut away to show the connected cable for opening and closing the mechanism;

FIG. 6 is a partial perspective view showing the joining portions of segments having a guiding roller attachment thereto;

FIG. 7 is a side elevation with portions cut away of a portion of a third embodiment of a clamping mechanism having a cord attached to a spool having a handle for opening or closing the clamping mechanism; and FIG. 8 shows a partial perspective view of one segment having the guided cord passing thereover.

DESCRIPTION OF THE PREFERRED EMBODIMENT

Figure 1:
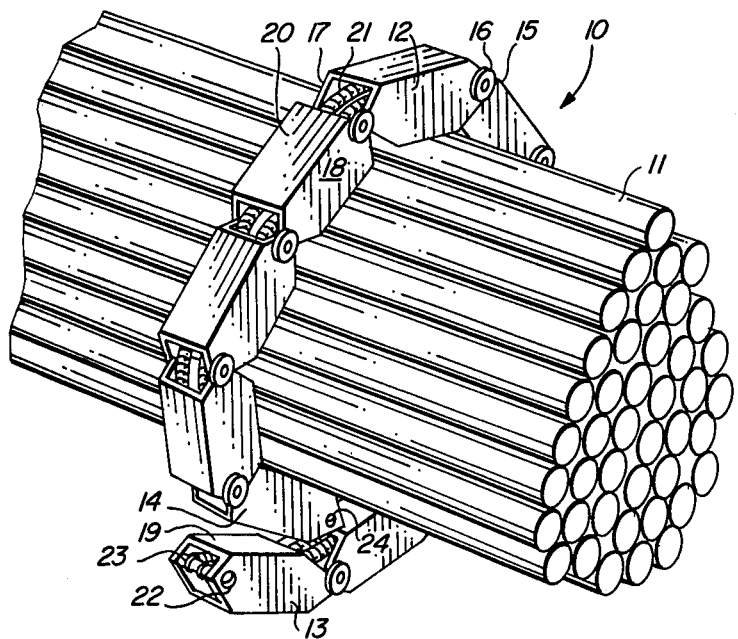
FIG. 1 is a perspective view of a clamping mechanism in accordance with the present invention and clamped onto a plurality of elongated cables.
Figure 2:
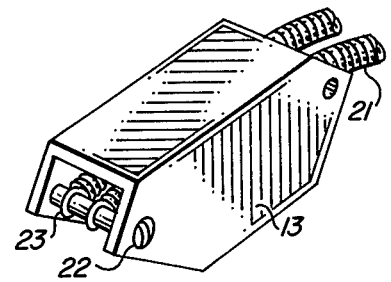
FIG. 2 is a perspective view of an end clamping segment.
Figure 3:
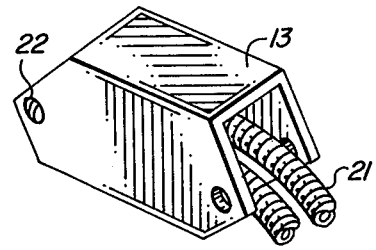
FIG. 3 is a perspective view of the other end of the segment of FIG. 2.
Figure 4:
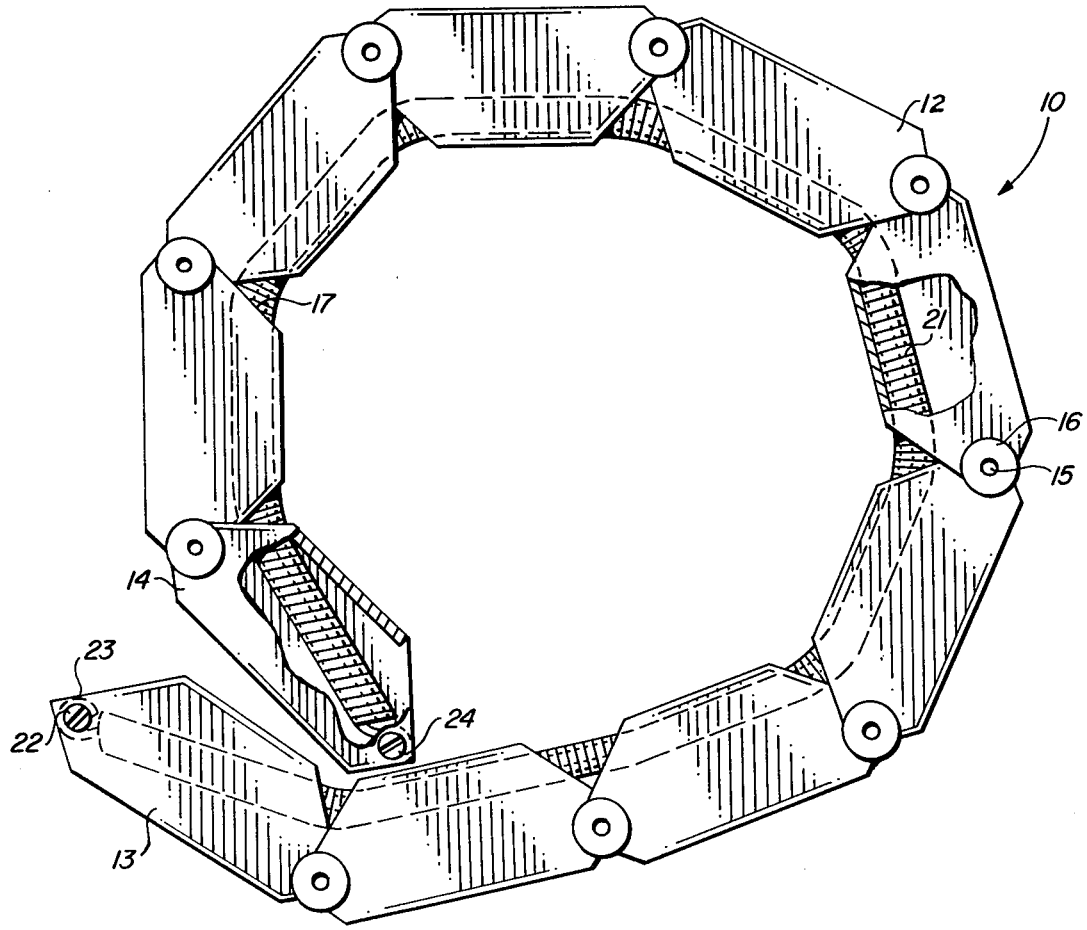
FIG. 4 is a side elevation having a broken away portion of the clamping mechanism in accordance with FIGS. 1 through 3.

Referring to the drawings and especially to FIGS. 1 through 3, a first preferred embodiment of a clamping mechanism 10 is shown attached to a plurality of elongated cables 11 in FIG. 1. A clamping mechanism is made up of a plurality of clamp segments 12 including an end clamp segment 13 and an end clamp segment 14. Each clamp segment 12 is pinned with a pin 15 on one end to an adjacent clamp segment 12 and may provide slip washers 16 beneath each pin 15. Each clamp segment 12 is connected to another clamp segment on both ends except the end clamp segments 13 and 14 which are attached on only one end to adjacent clamp segments. The clamp segments 12 are all identical and are shaped with narrowing or pointed ends 17 on each end where the pin 15 pins the segments together, thereby allowing the segments to freely pivot and wrap around a bundle of cables as in FIG. 1. Each clamp segment also has a pair of flat sides 18, a flat top 20, and a generally flat bottom 19. It will, of course, be clear that the bottom 19, sides 18, or top 20 can be curved or have other shapes without departing from the spirit and scope of the invention. A pair of springs 21 extend through the hollow clamp segments 12 and are held with a pin 24 in segment 14 to thereby bias a series of attached clamp segments to hold them wrapped around the bundle of cables 11. The clamping mechanism 10 can be of such length and clamped tightly to extend either end clamp segment 13 or 14 over or beside each other or other segment 12 so that different numbers of cables 11 can be attached and maintained in a tight bundle. Similarly, the end segments 13 and 14 can be gripped and opened to open the clamping mechanism 10 which will hold itself open by virtue of the central springs 21 moving to the other side of the bent back segments 12, as in FIG. 7, while cables 11 are added or removed from the bundle. It will also be clear that one of the segments can be attached to a wall or surface to hold a bundle of cables adjacent the surface.

Turning now to FIGS. 5 and 6, a second embodiment of a clamping mechanism 25 is shown having a plurality of clamping segments 26 connected with pins 27, similar to embodiments shown in FIGS. 1 through 4. This embodiment has one or more springs 28 attached to an end member 30 pin 31. It will be clear that the spring 28 can be attached to the end segments in any manner desired. Also attached to the pin 31 is a metal band 32 which extends over roller guides 33 each supported by a pin 27 holding the segments 26 together. The band is thereby guided over the outside of the segments 26 and wrapped from both directions onto a spool 34 having a handle 35. A ratchet and pawl or other locking mechanism can be used to lock the clamping mechanism 25 into an open position if desired.

FIGS. 7 and 8 show yet another embodiment of a clamping mechanism 36 having a plurality of segments 37 connected with pins 38 and having one or more springs 40 extending therethrough. In this embodiment, a cable or cord 41 extends through a plurality of eyes 42 attached to the segments 37 and are attached to an end segment 43 pin 44 with a loop 45 to hold the cable on each end. The cable extends through the eyes 42 and onto a spool 46 mounted to one of the segments 37 and having a spool handle 47 for winding the cable 41 onto the spool from both directions for use in opening or releasing the clamping mechanism 26 onto a bundle of cables, or the like. A ratchet and pawl mechanism 48 locks the spool 46 in place to hold the clamping mechanism 36 open until released. It should be clear that this embodiment is especially useful in clamping together bundles of large cables or pipes, or the like, where the large clamping mechanism would be more difficult to operate.

It should be clear at this time that several embodiments of clamping mechanisms have been provided, each of which uses a plurality of variously shaped segments which may be metal or polymer segments as desired, held together by metal pins but which can be movably held together in some other manner and which are biased with springs or other elastic members to form a clamping mechanism for cables, or the like. However, the present invention is not to be construed as limited to the forms shown, which are considered to be illustrative rather than restrictive.

I claim:

1. A clamping mechanism for clamping cables, cords, or the like, comprising in combination:
   a plurality of hollow clamp segments, each segment being movably pinned to at least one other segment forming pivot points and having a pair of end segments not attached to each other; and
   a flexible biasing means extending through each said clamp segment hollow portion of each of said plurality of clamp segments and said biasing means having at least each end thereof attached to each said end segment to apply a constant compression force to the pivot points of each clamp segment, whereby said clamping mechanism can be wrapped at least 180 degrees around one or more items extending therethrough for clamping said items together.

2. A clamping mechanism in accordance with claim 1, in which said biasing means includes at least one spring passing through said plurality of clamp segments and connected to each end segment.

3. A clamping mechanism in accordance with claim 2, in which each clamping segment has a pair of generally pointed end portions, each end portion being adapted to be attached to an end portion of an adjacent clamp segment.

4. A clamping segment in accordance with claim 3, in which an elongated spring extends through said plurality of clamp segments and are held to each end segment with a pin.

5. A clamping mechanism in accordance with claim 3, in which each clamp segment is a hollow clamp segment having an offset generally pointed portion on either end thereof which can be pivotably attached to the end portion of an adjoining segment to allow movement of the clamping segments on each other in one direction to wrap said clamping mechanism around a bundle of cables, or the like.

6. A clamping mechanism in accordance with claim 5 in which a plurality of clamp segments have guides mounted thereto and an elongated flexible member passing through said guides and attached to one end segment and connected to a spool, whereby rotating said spool will force the clamping mechanism opened or closed in accordance with where on the segment the guides are placed.

7. A clamping mechanism in accordance with claim 6 in which said spool is rotatably mounted to one clamp segment and has a handle thereon for rotating said spool thereby forcing the clamping mechanism open or closed.

8. A clamping mechanism in accordance with claim 5, in which said clamping mechanism has a plurality of rollers each attached between attached clamp segments with the pins attaching adjacent segments and has a flexible elongated member attached to one end segment and extending over the plurality of rollers and onto a spool.

9. A clamping mechanism in accordance with claim 8, in which said spool is rotatably attached to one clamp segment and has a handle for rotating the spool for opening or closing the clamping mechanism.

10. A clamping mechanism in accordance with claim 9, in which said flexible elongated member is a band riding in guides having flanged ends for holding said band in position around the outside of said clamp segments.

11. A clamping mechanism in accordance with claim 10, in which said rollers are attached with pins attaching pairs of clamp segments together.

12. A clamping mechanism in accordance with claim 8, in which said spool includes a ratchet and pawl mechanism for holding said spool in a predetermined position, whereby said clamping mechanism can be held in a plurality of positions.

* * * * *